United States Patent
Lu et al.

(10) Patent No.: US 9,566,777 B2
(45) Date of Patent: Feb. 14, 2017

(54) AUTOMATIC FILM PEELING MACHINE AND FILM PEELING METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Li-Chin Lu, New Taipei (TW); Jian-Hua Xiang, Shenzhen (CN); Xue Mou, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/726,819

(22) Filed: Jun. 1, 2015

(65) Prior Publication Data
US 2016/0185097 A1    Jun. 30, 2016

(30) Foreign Application Priority Data
Dec. 29, 2014   (CN) .......................... 2014 1 0832082

(51) Int. Cl.
B32B 38/10      (2006.01)
B32B 43/00      (2006.01)
B32B 38/18      (2006.01)

(52) U.S. Cl.
CPC .............. B32B 43/006 (2013.01); *B32B 38/10* (2013.01); *B32B 38/1858* (2013.01); *B32B 2457/00* (2013.01); *Y10T 156/1137* (2015.01); *Y10T 156/1168* (2015.01); *Y10T 156/1939* (2015.01)

(58) Field of Classification Search
CPC .... B32B 38/10; B32B 43/006; Y10T 56/1137; Y10T 56/1168; Y10T 56/1939
USPC ......................................... 156/708, 714, 757
See application file for complete search history.

(56) References Cited

U.S. PATENT DOCUMENTS

| | | | | |
|---|---|---|---|---|
| 4,685,991 A | * | 8/1987 | Herrmann | B26D 3/282 156/701 |
| 4,897,148 A | * | 1/1990 | Orlandi | H05K 3/288 156/510 |
| 5,358,591 A | * | 10/1994 | Candore | B29C 63/0013 156/707 |
| 6,500,298 B1 | * | 12/2002 | Wright | B29C 63/0013 156/708 |

(Continued)

*Primary Examiner* — Mark A Osele
*Assistant Examiner* — Nickolas Harm
(74) *Attorney, Agent, or Firm* — Zhigang Ma (57) ABSTRACT

An automatic film peeling machine for peeling a film adhered on a board, includes a workbench, a frame mounted on the workbench including a movable pushing block, a supporting plate mounted on the frame, a suction plate for locating the board on the supporting plate, and a peeling module. The peeling module includes a sliding member, a resisting member and a movable clamping member mounted on the sliding member. The clamping member includes a clamping portion with a plurality of vents. Air is blown out from the vents for rotating a movable un-adhered portion of the film into a space between the clamping portion and the resisting member. The clamping member is moved toward the resisting member for clamping the movable un-adhered portion. The pushing block is moved to push the sliding member away from the frame, for peeling the first film from the board.

12 Claims, 7 Drawing Sheets

(56) References Cited

U.S. PATENT DOCUMENTS

| | | | | |
|---|---|---|---|---|
| 6,503,130 B2* | 1/2003 | Lim | ........................ | B24B 37/34 |
| | | | | 156/716 |
| 7,846,288 B2* | 12/2010 | Larson | ................ | B29C 63/0013 |
| | | | | 156/247 |
| 8,349,129 B2* | 1/2013 | Blanchard | ............. | B32B 43/006 |
| | | | | 156/707 |
| 2013/0133178 A1* | 5/2013 | Lu | ........................ | G02F 1/1303 |
| | | | | 29/592.1 |
| 2013/0133839 A1* | 5/2013 | Seo | ...................... | B32B 43/006 |
| | | | | 156/715 |
| 2014/0076501 A1* | 3/2014 | Kim | ..................... | B32B 43/006 |
| | | | | 156/760 |

* cited by examiner

AUTOMATIC FILM PEELING MACHINE AND FILM PEELING METHOD

FIELD

The subject matter herein generally relates to an automatic film peeling machine for an electronic device.

BACKGROUND

In usual, a film peeling machine adopts a roller driven by a motor to peel a film, and the structure of the film peeling machine is complex.

BRIEF DESCRIPTION OF THE DRAWINGS

Implementations of the present technology will now be described, by way of example only, with reference to the figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure described in relation to an automatic film peeling machine capable of peeling films.

Figure 1:
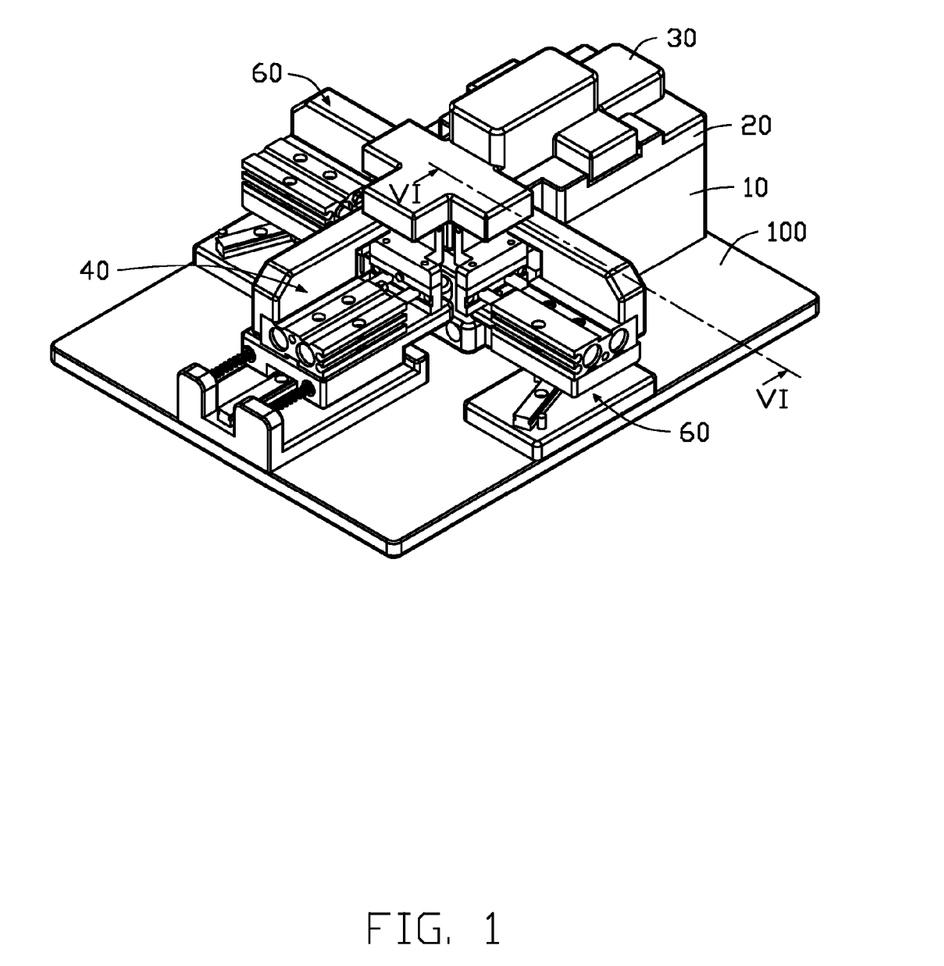
FIG. 1 is an isometric view of an embodiment of an automatic film peeling machine, wherein the automatic film peeling machine includes a first peeling module and two second peeling modules.
Figure 2:
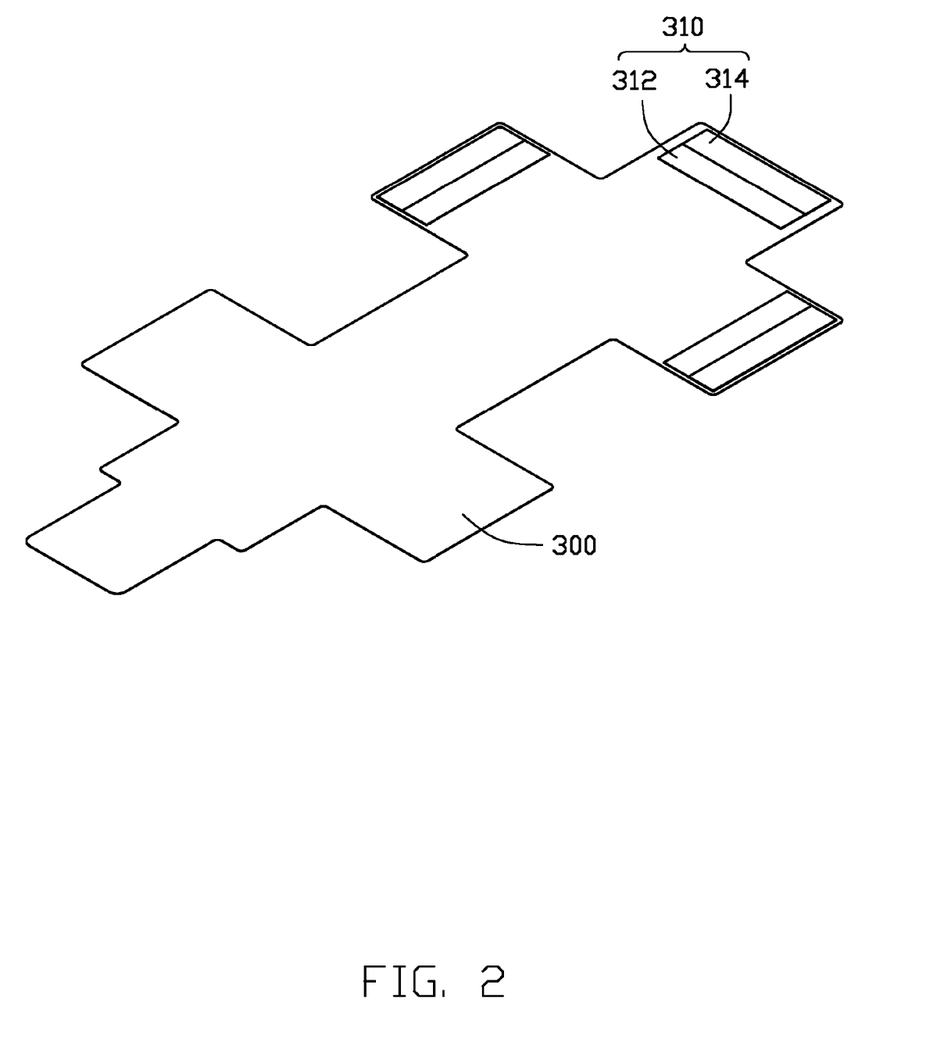
FIG. 2 is an isometric view of a board.

FIGS. 1 and 2 illustrate an embodiment of an automatic film peeling machine. The automatic film peeling machine is used for peeling three films 310 respectively located on a board 300 in three different directions. The automatic film peeling machine comprises a workbench 100, a frame 10 mounted on the workbench 100, a supporting plate 20 mounted on the frame 10, a suction plate 30 mounted on the supporting plate 20, a first peeling module 40 mounted on the workbench 100 in front of the frame 10, and two second peeling modules 60 symmetrically mounted on the workbench 100 at opposite sides of a front end of the frame 10. Each film 310 comprises an attached portion 314 adhered to the board 300, and a movable un-adhered portion 312 coupled to the conglutination portion 314.

Figure 3:
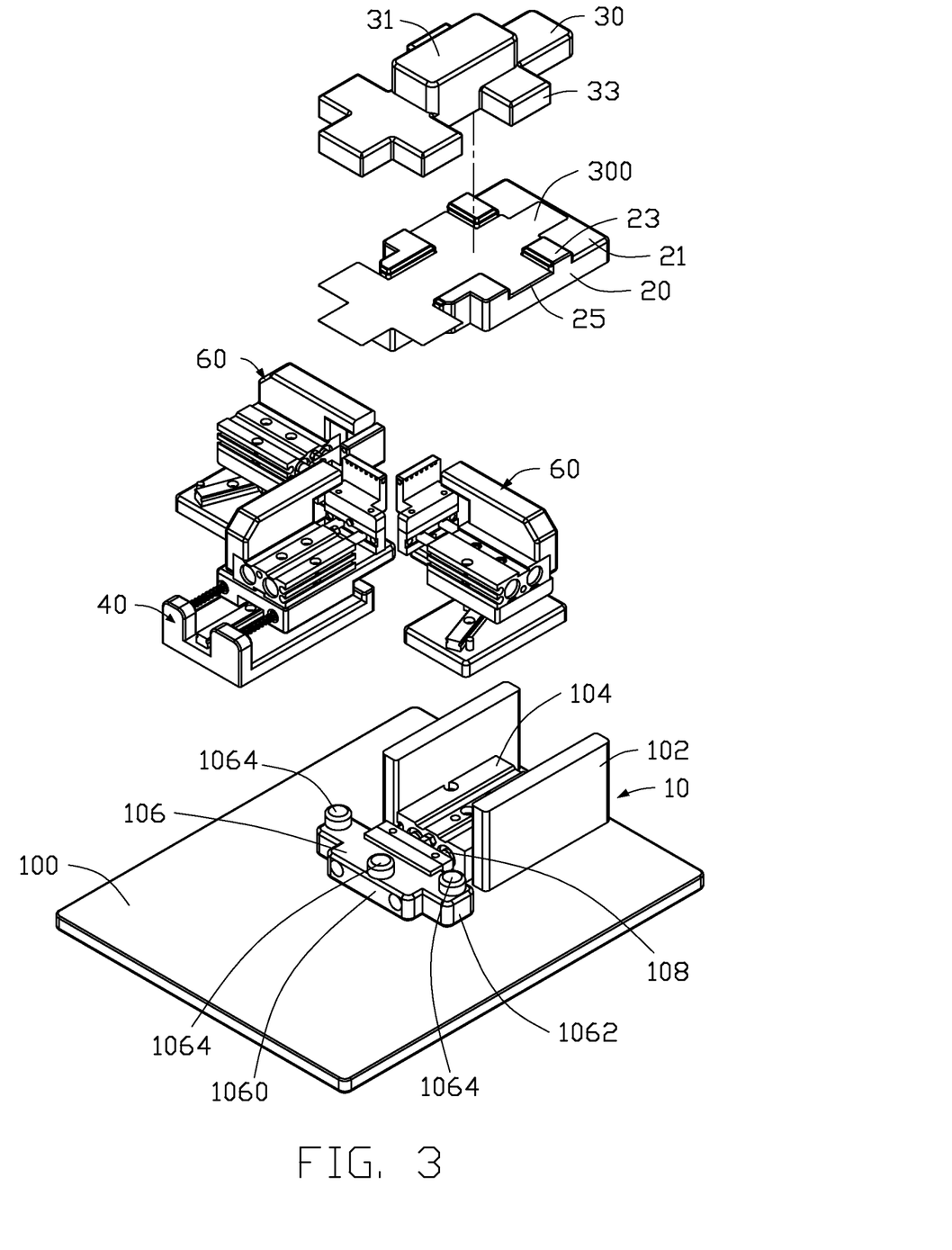
FIG. 3 is an exploded, isometric view of FIG. 1.

FIG. 3 illustrates that the frame 10 is fixed on one end of the workbench 100. The frame 10 comprises two spaced and parallel supporting boards 102, a first air cylinder 104 fixed between the two supporting boards 102, and a pushing block 106 located at one end of the first air cylinder 104. The first air cylinder 104 comprises a first piston rod 108. The pushing block 106 is fixed at a front end of the first piston rod 108 and makes reciprocating motion together with the first piston rod 108. The pushing block 106 comprises a first moving portion 1060 at a front of the pushing block 106 and two second moving portions 1062 at two sides of the pushing block 106. Each of the first moving portion 1060 and the second moving portions 1062 protrudes a fixing column 1064 at top.

The supporting plate 20 comprises a supporting portion 21 mounted on the two supporting boards 102 and a plurality of positioning blocks 23 extending from a top surface of the supporting portion 21. The positioning blocks 23 and the top surface of the supporting portion 21 cooperates to form a receiving space 25 for fixing the board 300 therein.

The suction plate 30 comprises an operation portion 31, and at least one suction portion 33 extending from a bottom side of the operation portion 31 for absorbing the board 300.

Figure 4:
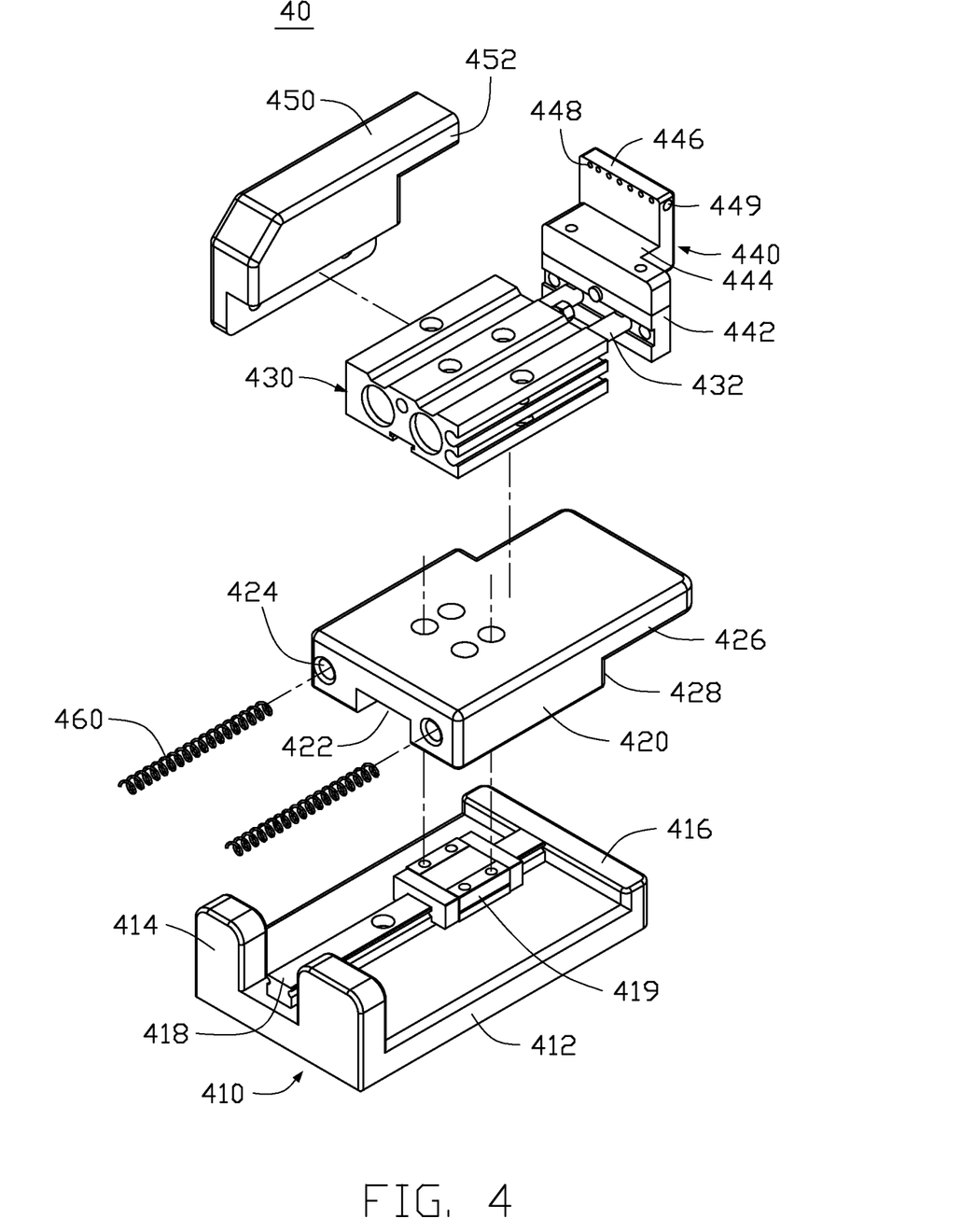
FIG. 4 is an exploded, isometric view of the first peeling module of FIG. 1.

FIG. 4 illustrates that the first peeling module 40 comprises a first base 410 to be mounted on the workbench 100, a first sliding member 420 slidably mounted on the first base 410, a second air cylinder 430, and a first clamp mounted on the second air cylinder 430. The first clamp comprises a first clamping member 440 and a first resisting member 450.

The first base 410 comprises a substantially rectangular first bottom plate 412 to be fixed on the workbench 100, two spaced limiting plates 414 vertically extending up from two sides of a front end of the first bottom plate 412, a stop plate 416 vertically extended up from a rear end of the first bottom plate 412, a first slide rail 418 fixed on the first bottom plate 412 perpendicular to the stop plate 416 and located between the two limiting plates 414, and a first sliding block 419 slidably mounted on the first slide rail 418. The first sliding member 420 is fixed on the first sliding block 419. The first sliding member 420 defines a sliding slot 422 at the middle of the bottom to receive the first slide rail 418. The front end of the first sliding member 420 defines two receiving holes 424. First ends of two elastic elements 460 are respectively received in the receiving holes 424, and second ends of the two elastic elements 460 abut against the limiting plates 414 of the first base 410. The first sliding member 420 further comprises a sliding portion 426 extending from the upper side of the rear end of the first sliding member 420. A resisting portion 428 is formed at the lower side of the rear end of the first sliding member 420.

The second air cylinder 430 is fixed at a top of the first sliding member 420. The second air cylinder 430 comprises two parallel second piston rods 432 extending rearward. The first clamping member 440 comprises a first fixing portion 442 fixed at rear ends of the two second piston rods 432, a first extending portion 444 extending vertically and outwardly from the top of the first fixing portion 442, and a first clamping portion 446 extending vertically and upwardly from the rear end of the first extending portion 444. An upper side of the first clamping portion 446 defines a plurality of first air outlet holes 448 facing the second air cylinder 430. An end of the first clamping portion 446 defines a first air intake hole 449 in communication with the first air outlet holes 448. In at least one embodiment, the first air intake hole 449 can be coupled to an air pump to get air flow.

The first resisting member 450 is fixed at a side of the second air cylinder 430. The first resisting member 450 comprises a first abutment portion 452 facing the first clamping portion 446.

Figure 5:
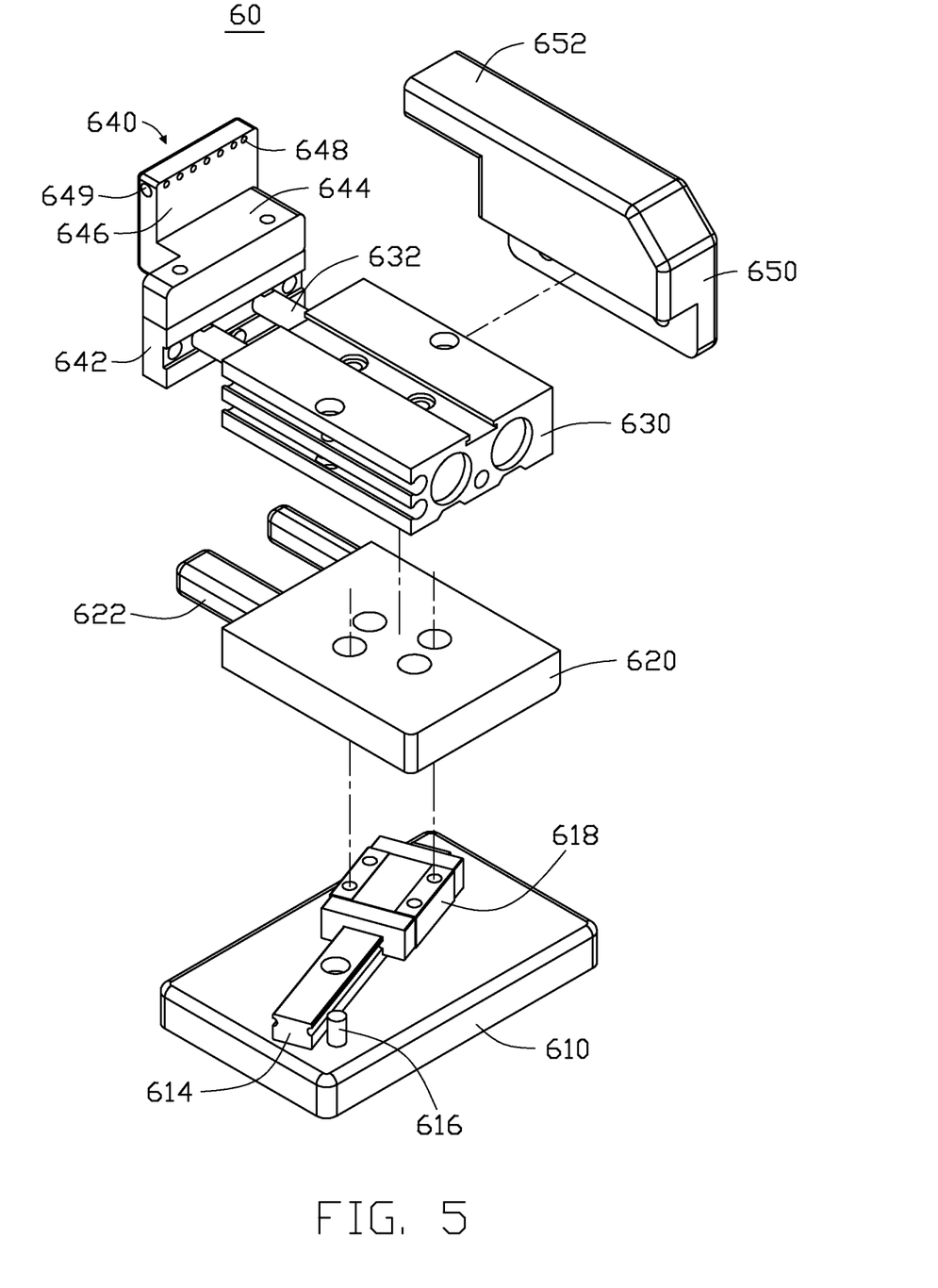
FIG. 5 is an exploded, isometric view of one of the second peeling modules of FIG. 1.

FIG. 5 illustrates that each second peeling module 60 comprises a second base 610 to be mounted on the workbench 100 beside the pushing block 106, a second sliding member 620 slidably mounted on the second base 610, a third air cylinder 630, and a second clamp mounted on the third air cylinder 630. The second clamp comprises a second clamping member 640 and a second resisting member 650.

A second slide rail 614 and a protrusion 616 are formed on a top surface of the second base 610. A second sliding block 618 is slidably mounted on the second slide rail 614. The second slide rail 614 is slanted substantially along a diagonal line of the top surface of the second base 610. Rear ends of the two second slide rails 614 are closer to each other, and front ends of the two second slide rails 614 are further away from each other (as shown in FIG. 1). The protrusion 616 is located adjacent to a front end of the second slide rail 614. The second sliding member 620 is fixed on the second sliding block 618. Two spaced limiting rods 622 extend from one end of the second sliding member 620 toward the pushing block 106.

The third air cylinder 630 is fixed at a top of the second sliding member 620. The third air cylinder 630 comprises two parallel third piston rods 632 extending toward the pushing block 106. The second clamping member 640 comprises a second fixing portion 642 coupled to distal ends of the third piston rods 632, a second extending portion 644 extending vertically and outwardly from the top of the second fixing portion 642, and a second clamping portion 646 extending vertically and upwardly from a distal end of the second extending portion 644. An upper side of the second clamping portion 646 defines a plurality of second air outlet holes 648 facing the third air cylinder 630. An end of the second clamping portion 646 defines a second air intake hole 649 in communication with the second air outlet holes 648. In at least one embodiment, the second air intake hole 649 can be coupled to an air pump to get air flow.

The second resisting member 650 is fixed to a rear side of the third air cylinder 630. The second resisting member 650 comprises a second abutment portion 652 facing the second clamping portion 646.

Figure 6:
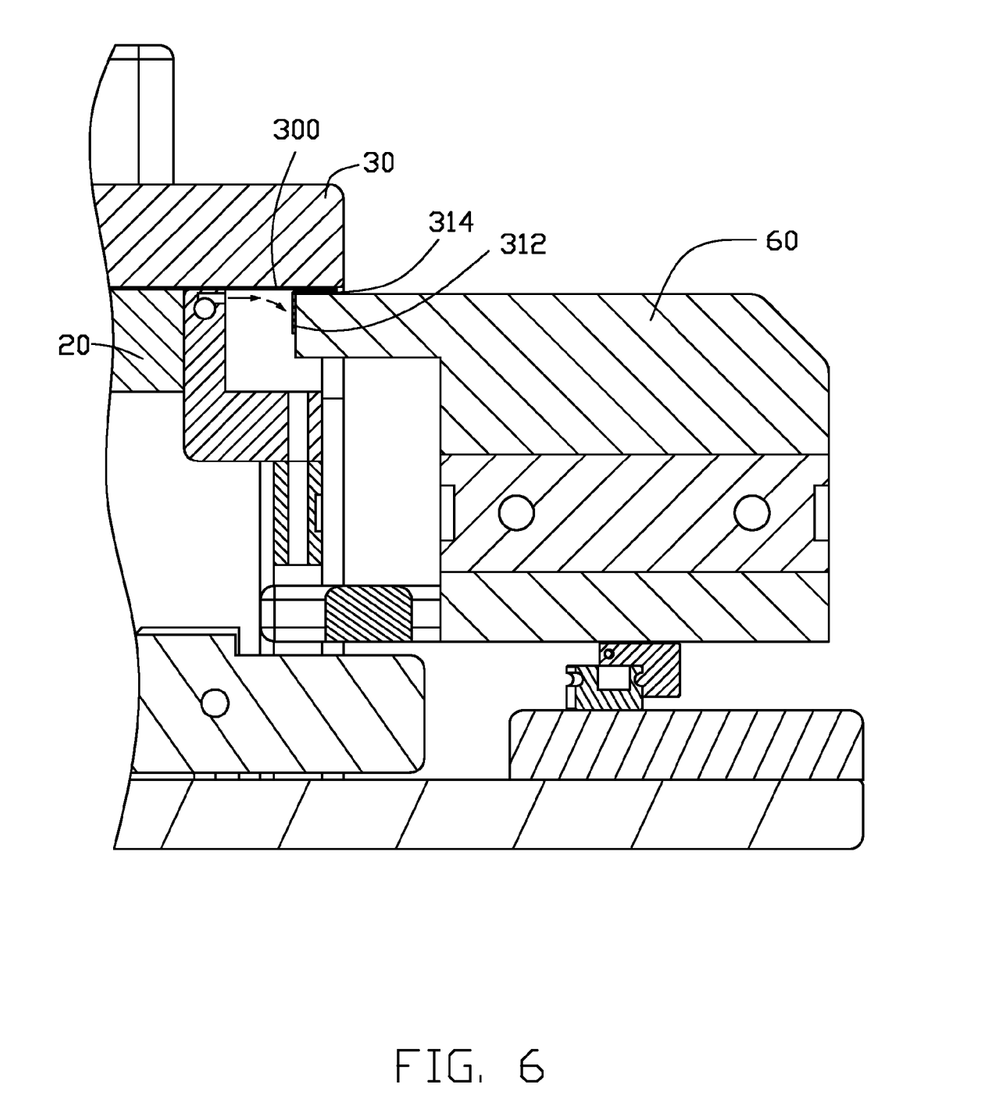
FIG. 6 is a partial cross-sectional view taken along line VI-VI of FIG. 1.
Figure 7:
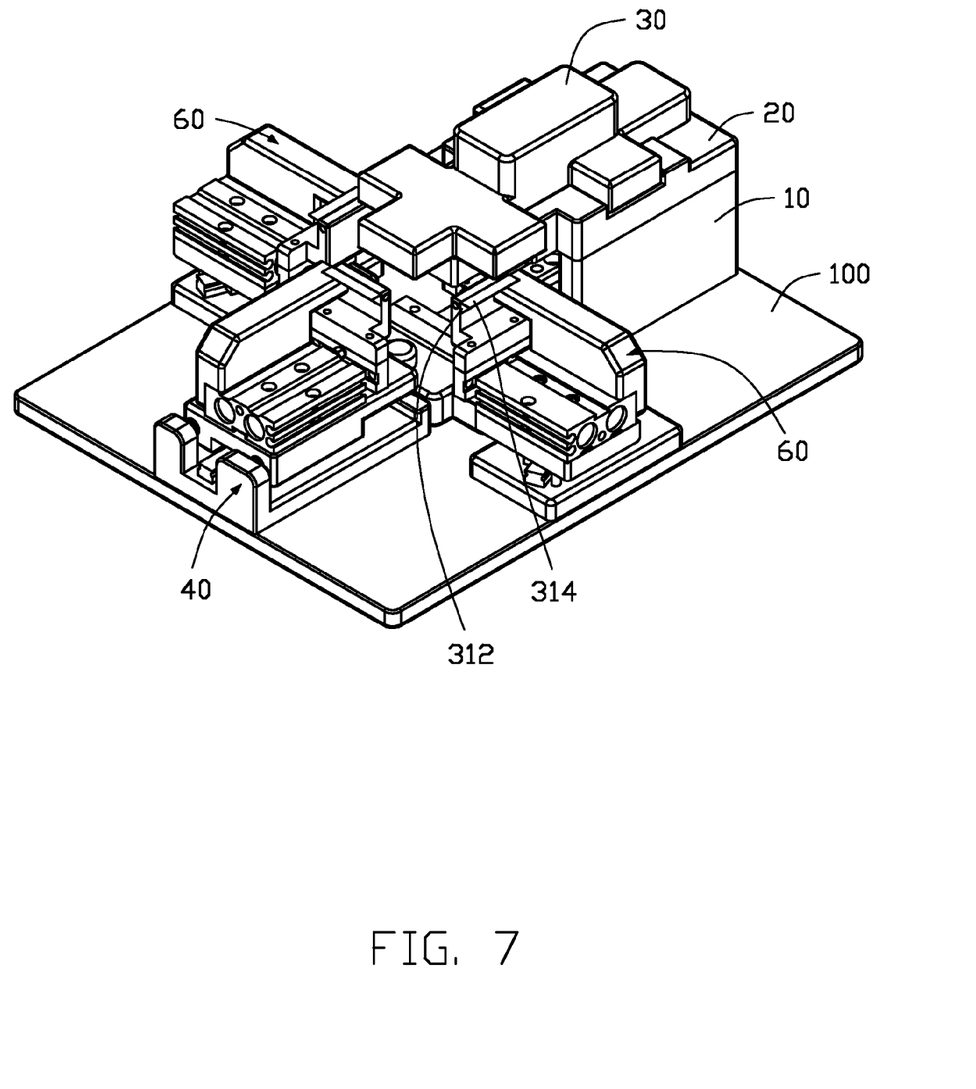
FIG. 7 is an isometric view of the automatic film peeling machine of FIG. 1 in a state of use.

FIGS. 6 and 7 illustrate how the automatic film peeling machine 100 works. In an original state, the first sliding block 419 of the first peeling module 40 is located on the first slide rail 418 adjacent to the stop plate 416. The resisting portion 428 abuts against the stop plate 416. A rear end of the sliding portion 426 is adjacent to the fixing column 1064 of the first moving portion 1060 of the pushing block 106. The second sliding blocks 618 of the two second peeling modules 60 are respectively located at rear ends of the second slide rails 614 away from the protrusions 616, and the fixing column 1064 of each second moving portion 1062 is slidably located between the two spaced limiting rods 622 of the corresponding second sliding member 620.

The suction portion 33 of the suction plate 30 secures the board 300 and puts the board 300 in the receiving space 25 of the supporting plate 20 with the films 310 facing downward. The second piston rods 432 of the second air cylinder 430 extend out to locate the first clamping portion 446 under a rear side of a corresponding one of the films 310 of the board 300, a receiving space is defined between the first clamping portion 446 and the first abutment portion 452. The third piston rods 632 of the third air cylinders 630 extend out to locate the second clamping portions 646 under inner sides of the other two films 310 of the board 300, a receiving space is defined between each second clamping portion 646 and the corresponding second abutment portion 652. The first air outlet holes 448 and the second air outlet holes 648 blow air towards the un-adhered portions 312 of the films 310 by the air pumps coupled to the first and second air intake holes 449 and 649 or fans installed in the first and second clamping members 440 and 640. One of the movable un-adhered portions 312 is blown to rotate down and locate between the first clamping portion 446 and the first abutment portion 452, and the other two movable un-adhered portions 312 are blown to rotate down and locate between the second clamping portions 646 and the corresponding second abutment portions 652. The second piston rods 432 of the second air cylinder 430 are retracted to make the one of the movable un-adhered portions 312 be sandwiched between the first clamping portion 446 and the first abutment portion 452. The third piston rods 632 of the two third air cylinders 630 are retracted to make the other two movable un-adhered portions 312 be respectively sandwiched between the second clamping portions 646 and the corresponding second abutment portions 652.

The first piston rod 108 of the first air cylinder 104 extends out to push the pushing block 106 forward. The fixing column 1064 of the first moving portion 1060 of the pushing block 106 pushes the sliding portion 426 to allow the first sliding member 420 to slide forward along the first slide rail 418 until the first sliding member 420 abuts against the limiting plates 414. The elastic elements 460 are compressed. At the same time, the fixing columns 1064 of the second moving portions 1062 push the limiting rods 622 to allow the second sliding members 620 to slide forward and away from each other along the second slide rails 614 until the second sliding blocks 618 abut against the protrusions 616. The first peeling module 40 and the second peeling modules 60 pull the three movable un-adhered portions 312, to tear the three films 310 from the board 300.

The first piston rod 108 of the first air cylinder 104 is retracted to restore the second sliding members 620, and the elastic elements 460 are restored to push the first sliding member 420 back.

The first peeling module 40 and the two second peeling modules 60 respectively clamp three films 310 at three different directions, and can peel the three films 310 at the same time.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An automatic film peeling machine for peeling a first film adhered on a board, the first film comprises a movable un-adhered portion, the automatic film peeling machine comprising:
   a workbench;
   a frame mounted on the workbench, wherein the frame comprises a movable pushing block;
   a supporting plate mounted on a top of the frame;
   a suction plate for absorbing the board and locating the board on the supporting plate; and
   a first peeling module comprising a first sliding member slidably mounted to the workbench, a first resisting member and a first clamping member mounted to the first sliding member, wherein the first clamping member is slidable relative to the first resisting member, the first clamping member comprises a first clamping portion for being located under the movable un-adhered portion of the first film, the first clamping portion comprises a plurality of vents;
   wherein air is blown out from the vents for rotating the movable un-adhered portion into a space between the first clamping portion and the first resisting member, the first clamping member is moved toward the first resisting member for clamping the movable un-adhered portion between the first clamping portion and the first resisting member, the pushing block is moved to push the first sliding member away from the frame, for peeling the first film from the board.

2. The automatic film peeling machine of claim 1, wherein the frame further comprises a first air cylinder, the first air cylinder comprises a first piston rod, the pushing block is coupled to a front end of the first piston rod and is capable of making reciprocating motion together with the first piston rod, the pushing block comprises a first moving portion at a front of the pushing block to push the first sliding member.

3. The automatic film peeling machine of claim 2, wherein the frame further comprises two spaced supporting boards fixed on the workbench for supporting the supporting plate, the first air cylinder is located between the supporting boards.

4. The automatic film peeling machine of claim 2, wherein the first peeling module further comprises a second air cylinder fixed on the first sliding member, the second air cylinder comprises a second piston rod, the first clamping member is coupled to a distal end of the second piston rod, the first resisting member is coupled to a side of the second air cylinder and comprises a first abutment portion facing the first clamping portion.

5. The automatic film peeling machine of claim 4, wherein the first peeling module further comprises a first base mounted on the workbench, the first sliding member is slidably mounted on the first base, an elastic element is connected between the first sliding member and the first base, to restore the first sliding member when the pushing block is moved back.

6. The automatic film peeling machine of claim 3, wherein the first base comprises a first bottom plate mounted on the workbench, a limiting plate extending up from an end of the first bottom plate, a first slide rail formed on the workbench perpendicular to the limiting plate, and a first sliding block slidably coupled to the first slide rail, the first sliding member is fixed on the first sliding block, opposite ends of the elastic element respectively abut against the limiting plate and the first sliding member.

7. The automatic film peeling machine of claim 6, wherein the first base further comprises a stop plate extending up from a rear end of the first bottom plate, the first sliding member further comprises a sliding portion extending from an upper side of a rear end of the first sliding member to abut against the first pushing block, and a resisting portion formed at a lower side of the rear end of the first sliding member to abut against the stop plate.

8. The automatic film peeling machine of claim 2, further comprising two second peeling modules symmetrically fixed on the workbench at opposite sides of the pushing block, for peeling two second films adhered on the board at opposite sides of the first film, wherein each second peeling module comprises a second sliding member slantingly slidable relative to the sliding direction of the pushing block, a second resisting member and a second clamping member mounted to the second sliding member, the second clamping member is slidable relative to the second resisting member, the second clamping member comprises a second clamping portion for being located under a movable un-adhered portion of a corresponding one of the second films, the second clamping portion comprises a plurality of vents, air is blown out from the vents of the second clamping portions for rotating the movable un-adhered portion of each second film into a space between the second clamping portion and the second resisting member of the corresponding second peeling module, each second clamping member is moved toward the corresponding second resisting member for clamping the corresponding movable un-adhered portion, the pushing block is moved to push the second sliding members away from the frame and away from each other, for peeling the second films from the board.

9. The automatic film peeling machine of claim 8, wherein each second peeling module further comprises a third air cylinder fixed on the second sliding member, the third air cylinder comprises a third piston rod, the second clamping member is coupled to a distal end of the third piston rod, the second resisting member is coupled to a side of the third piston rod and comprises a second abutment portion facing the second clamping portion.

10. The automatic film peeling machine of claim 9, wherein each second peeling module further comprises a second base mounted on the workbench, a slanted second slide rail formed on a top of the second base, and a second sliding block slidably coupled to the second slide rail, the second sliding members are respectively fixed on the second sliding blocks of the second peeling modules, rear ends of the second slide rails of the second peeling modules are adjacent to each other, and front ends of the second slide rails of the second peeling modules are away from each other.

11. The automatic film peeling machine of claim 10, wherein the pushing block further comprises two second moving portions at two sides of the first moving portion, a fixing column extends up from a top of each second moving portion, each second sliding member comprises two spaced limiting rods extending towards the pushing block, each fixing column is slidably located between the spaced limiting rods of the corresponding second sliding member.

12. The automatic film peeling machine of claim 10, wherein a protrusion is formed on the top of each second base adjacent to a front end of the corresponding second slide rail.

* * * * *